April 3, 1934.  C. E. SKELTON  1,953,636
SWIVEL CASTER WITH EXPANSIBLE SHANK
Filed Oct. 14, 1931
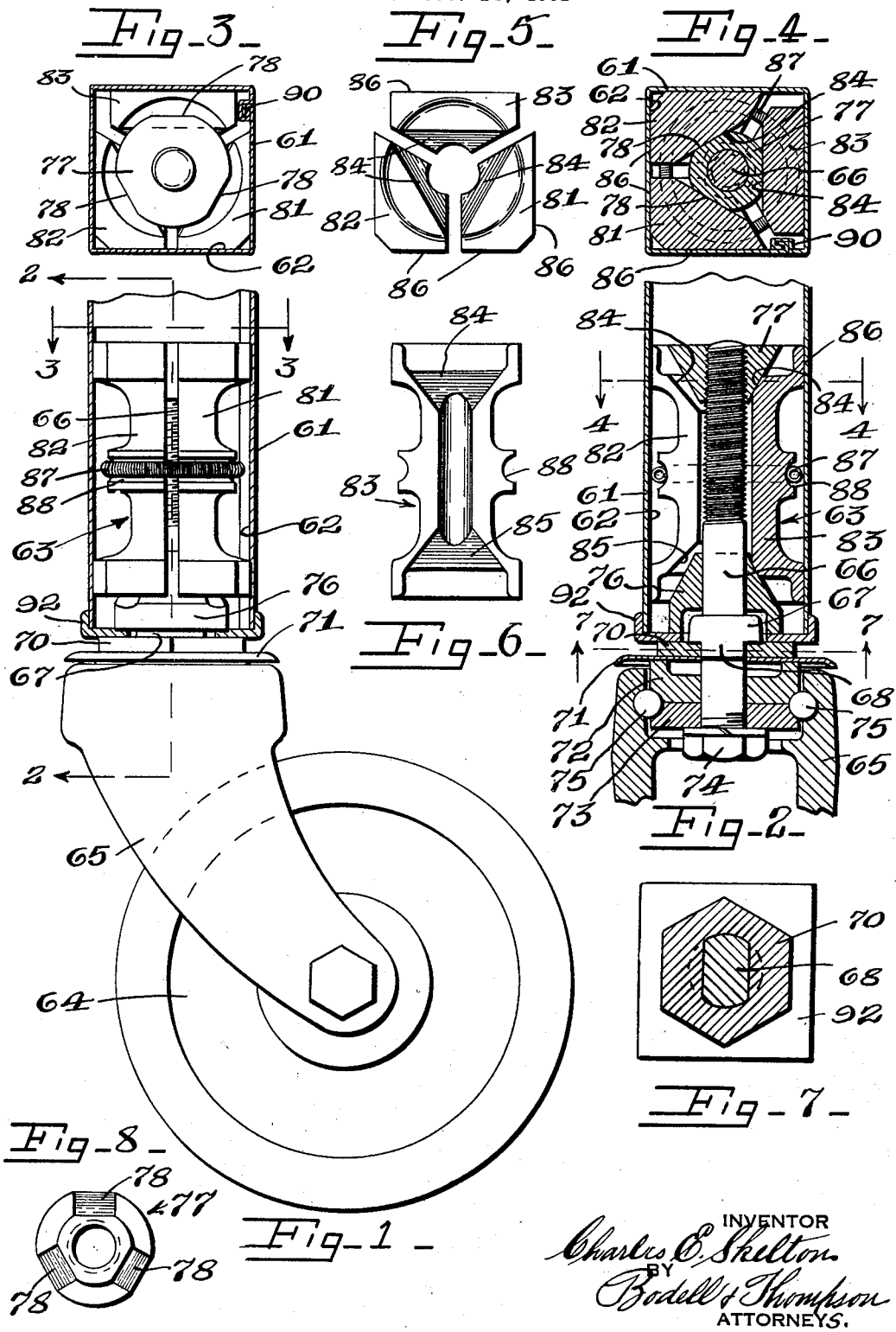

Patented Apr. 3, 1934

1,953,636

UNITED STATES PATENT OFFICE 1,953,636

SWIVEL CASTER WITH EXPANSIBLE SHANK

Charles E. Skelton, Syracuse, N. Y., assignor to Frederick K. Kilian, Syracuse, N. Y.

Application October 14, 1931, Serial No. 568,748

3 Claims. (Cl. 16—30)

This invention relates to swivel casters having shanks which may be expanded to fit sockets of different sizes in the legs of furniture.

The principal object of the invention is to provide an expansible shank for use in rectangular or square sockets, and which will always clamp against all four sides of the socket, regardless of whether the socket is a true rectangle or square.

A further object of the invention is to improve upon the expansible shank construction shown in the patent application of Frederick K. Kilian, Ser. No. 551,342, filed July 17, 1931.

A further object of the invention is to provide a shank having wedges for moving the expansible members of the shank into engagement with the walls of a socket, and to form such wedges with a non-circular cross section for engaging faces of non-circular contour on the expansible members, so that the wedges cannot turn without expanding the shank.

Other objects and advantages of the invention will appear and will be pointed out as the description proceeds.

The invention consists in the novel features and in the combinations and constructions hereinafter set forth and described.

In describing this invention, reference is had to the accompanying drawing in which like characters designate corresponding parts in all the views.

Figure 1 is a side elevation, partly in section, showing a swivel caster having an expansible shank, made in accordance with this invention, and mounted in the leg of a piece of furniture.

Figure 2 is a fragmentary sectional view along the line 2—2, of Figure 1.

Figure 3 is a top view taken along the line 3—3, of Figure 1.

Figure 4 is a sectional view along the line 4—4, of Figure 2.

Figure 5 is a top view showing the expansible members of the shank in expanded position, all parts of the construction, except the expansible members, being omitted.

Figure 6 is an elevation of one of the expansible members shown in Figure 5.

Figure 7 is a section along the line 7—7, of Figure 2.

Figure 8 is an end view looking along the axis of one of the wedges.

Figure 1 shows a leg 61, of a piece of furniture, formed hollow, or with a socket 62 opening through its lower end. An expansible shank 63 is mounted within the socket 62 and a caster wheel 64 is mounted on a fork or support 65 which is swivelly connected with the shank 63 by structure later to be described.

The construction of the shank 63 is shown in detail in Figure 2. A stem 66 is formed with a collar 67 and with a non-circular portion 68 on which is mounted a non-circular washer 70. The hole in the washer is formed to fit the non-circular portion 68 of the stem 66 and this washer 70 provides a tool grip to which a tool may be applied when it is desired to turn the stem 66 for the purpose of expanding the shank in a manner later to be described.

A dust shield 71 is mounted on the stem 66 below the washer 70 and raceway members 72 and 73 are mounted on the stem 66, below the dust shield 71, and securely held in position by suitable means, such as a nut 74 threading on the lower end of the stem 66.

The fork or caster wheel support 65 is formed with a raceway in its upper end and antifriction members, such as balls 75, are mounted in the raceways and provide a swivel connection between the stem 66 and the caster wheel support 65. This swivel connection between the caster wheel support 65 and the stem 66 is conventional and forms no part of the present invention.

A lower wedge 76 is rotatably mounted on the stem 66. The upper end of the stem 66 is threaded and an upper wedge member 77 is threaded on the upper portion of the stem 66. The wedge 77, and preferably the wedge 76 also, are provided with flat faces 78, as shown in Figure 8. The provision of these flat faces prevents the wedges from being circular in cross section and when the wedges are mounted within the expansible members of the shank, with the flat faces in contact with corresponding faces on the expansible members, it is impossible for the wedges to turn, with respect to the expansible members, without expanding the shank.

The shank is provided with expansible members, preferably three in number, and these expansible members 81, 82 and 83 are shown in Figures 3–5. Each of the expansible members is provided with an upper sloping face 84, of non-circular contour, for engaging one of the faces 78 on the upper wedge 77. Each of the expansible members is provided with a lower sloping face 85, preferably of non-circular contour, for engaging a corresponding face on the lower wedge 76.

The expansible members 81, 82 and 83 are provided with faces 86, at their upper and lower ends, for engaging the walls of the socket in which the shank is mounted.

The expansible members 81, 82 and 83 are normally held in retracted position by a resilient member, such as an endless spring 87 which surrounds the shank 63 and is mounted in a guide 88.

With certain types of furniture, such as metal furniture, a bead 90 is ordinarily formed on the inside of the furniture leg. The shank is formed so as to allow clearance for such a bead. In the embodiment of the invention shown, the expansible member 83 is made considerably shorter than the inside wall of the socket so as to allow ample clearance for the bead 90. If the invention were used with a piece of furniture having a socket larger than that shown in Figure 4 it is obvious that further expansion of the shank would provide even more clearance for a bead 90 in the larger piece of furniture.

Operation of the invention is as follows:—With the expansible members 81, 82 and 83 held in retracted position by the spring 87, the shank is inserted in a socket in a piece of furniture. When the shank has been inserted the proper distance in the socket, a cap 92, not previously mentioned, engages the lower end of the furniture leg. A tool is then applied to the washer 70 to turn the washer. Since the washer is provided with a non-circular hole fitting over a non-circular portion of the stem 66, turning of the washer 70 will also turn the stem 66.

When the stem 66 is thus turned, the upper threaded portion of the stem 66 will throw the upper wedge 77 downwardly toward the lower wedge 76. As the wedges 76 and 77 are thus thrown together the expansible members 81, 82 and 83 will be thrust outwardly against the sides of the socket.

The expansible member 81 is formed with two socket engaging faces which are substantially at right angles to one another as shown in Figures 3, 4 and 5. This expansible member 81 is located in position to engage a corner of the socket, such as the lower left hand corner of the socket shown in Figure 4. The expansible member 82 is formed with two socket engaging faces, similar to those of the expansible member 81 and is located in position to engage an adjacent corner of the socket, such as the upper left hand corner of the socket shown in Figure 4. The third expansible member 83 is formed with a face for engaging the socket wall remote from the corners with which the expansible members 81 and 82 engage. This arrangement of the expansible members causes the two of the expansible members 81 and 82 to be thrust against the sides of the socket in a diagonal direction, and the expansible member 83 to be thrust against the wall of the socket in a third direction. As a result of this clamping action, the shank expands in three directions and will therefore always firmly be held in position by a three-point clamping action, as distinguished from the older type of expansible socket, such as shown in the Kilian application referred to, in which the shank expands in four directions and may tightly clamp against two opposing walls before it engages with the other walls. Such two-point clamp is due to inaccuracies in the dimensions of the socket or of the expansible shank and produces unsatisfactory results since the shank is likely to become loose in the socket in a direction parallel to the walls against which the two-point clamping occurs.

From the foregoing description it is apparent that this invention provides a construction in which an expansible shank will always firmly engage with all four walls of a rectangular socket. If the wedge member 77 were of circular cross section it would be possible for it to turn as a unit with the stem 66 with the result that turning of the stem would not expand the shank. Due to the non-circular cross section of the wedge members it is obvious that they cannot turn as a unit with the stem without expanding the shank.

The preferred embodiment of the invention is illustrated but changes and modifications may be made without departing from the spirit of the invention as set forth in the appended claims.

What I claim is:

1. A caster mounting, for securing the caster in a rectangular socket in furniture, including in combination a caster wheel support; a stem having swivel connection with the caster wheel support; three members operatively connected with the stem; faces on one of said members for engaging the walls forming the angle of the socket; faces on another of said members for engaging the walls forming an adjacent angle of the socket; a face on the third member for engaging the wall of the socket remote from the angles with which the first two members engage, and means for moving said members to engage said faces with the socket walls mentioned and for holding said faces in clamping engagement with said walls.

2. A swivel caster including in combination a caster wheel support; an expansible shank formed with a plurality of members and shaped to fit a rectangular socket in an article of furniture; a swivel bearing connection between the support and the shank; expander means in said members for expanding the shank by shifting two of said members in a diagonal direction into engagement with adjacent corners of the socket and shifting the third of said members into engagement with a side of the socket remote from said corners; and means located at the lower end of the shank for operating said expander means.

3. A caster mounting for securing a caster in a socket having internal corners, including in combination a caster wheel support, an expansible shank having a plurality of members arranged in triangular formation about the axis of the shank, two of said members having faces engaging the side walls of the socket which meet to form two corner angles, and the third member engaging the inner face of another wall between the corners formed by that wall and the two adjacent sides of the socket, a swivel bearing connection between the support and the shank, expander means common to and coacting with two of said members for expanding two of them into two of the corners of the socket, and the third one against said wall between other corners, and means for operating the expanding means.

CHARLES E. SKELTON.